US008091122B2

(12) United States Patent
Guo et al.

(10) Patent No.: US 8,091,122 B2
(45) Date of Patent: Jan. 3, 2012

(54) COMPUTER PROGRAM PRODUCT, APPARATUS AND METHOD FOR SECURE HTTP DIGEST RESPONSE VERIFICATION AND INTEGRITY PROTECTION IN A MOBILE TERMINAL

(75) Inventors: Yile Guo, San Diego, CA (US); Tat Chan, San Diego, CA (US)

(73) Assignee: Nokia Corporation, Espoo (FI)

( * ) Notice: Subject to any disclaimer, the term of this patent is extended or adjusted under 35 U.S.C. 154(b) by 1042 days.

(21) Appl. No.: 11/566,894

(22) Filed: Dec. 5, 2006

(65) Prior Publication Data

US 2007/0150943 A1    Jun. 28, 2007

Related U.S. Application Data

(60) Provisional application No. 60/742,468, filed on Dec. 5, 2005.

(51) Int. Cl.
*G06F 7/04* (2006.01)
(52) U.S. Cl. .................................. 726/6; 726/7
(58) Field of Classification Search .................. 726/5, 6, 726/7
See application file for complete search history.

(56) References Cited

U.S. PATENT DOCUMENTS

| 6,230,002 B1 * | 5/2001 | Floden et al. ................. 455/411 |
| 2005/0102517 A1 * | 5/2005 | Paddon et al. ................ 713/168 |
| 2006/0129848 A1 | 6/2006 | Paksoy et al. |
| 2006/0236116 A1 * | 10/2006 | Patel ............................ 713/183 |
| 2007/0005730 A1 * | 1/2007 | Torvinen et al. .............. 709/219 |
| 2007/0150943 A1 * | 6/2007 | Guo et al. ......................... 726/5 |

FOREIGN PATENT DOCUMENTS

| EP | 1 324 576 A2 | 7/2003 |
| WO | WO 2005/032013 A1 | 4/2005 |
| WO | WO 2005/083910 A1 | 9/2005 |

OTHER PUBLICATIONS

Franks, J. et al, "HTTP Authentication: Basic and Digest Access Authentication", RFC 2617, IETF, Jun. 1999.*
International Search Report and Written Opinion for Application No. PCT/IB2006/003484 dated May 21, 2007.
International Preliminary Report on Patentability for Application No. PCT/IB2006/003484 dated Jun. 19, 2008.

\* cited by examiner

*Primary Examiner* — Jason K Gee
(74) *Attorney, Agent, or Firm* — Alston & Bird LLP (57) ABSTRACT

A mobile terminal for securely communicating with a network includes a user identity module (UIM) and a user equipment module. The user equipment module includes a client application. The UIM is in operable communication with the user equipment and includes a password provisioning module (PPM), a password generating module, a response verification module (RVM) and a response generation module (RGM). The PPM is configured to store a password. The password generating module is in operable communication with the PPM and configured to generate the password. The RGM and RVM are in operable communication with both the client application and the PPM. The RGM is configured to generate an authentication response from the password in response to a request from the client application. The RVM is configured to verify a request for a server digest response and generate a verification result in response to a request from the client application.

28 Claims, 6 Drawing Sheets

COMPUTER PROGRAM PRODUCT, APPARATUS AND METHOD FOR SECURE HTTP DIGEST RESPONSE VERIFICATION AND INTEGRITY PROTECTION IN A MOBILE TERMINAL

CROSS REFERENCE TO RELATED APPLICATION

This application claims the benefit of U.S. Provisional Application No. 60/742,468, filed Dec. 5, 2005, the contents of which are incorporated herein in their entirety.

TECHNOLOGICAL FIELD

Embodiments of the present invention relate generally to wireless technology and, more particularly, relate to the secure operation of a hyper text transfer protocol (HTTP) digest authentication in a mobile terminal.

BACKGROUND

Security of mobile terminals, such as portable communication devices (PCDs) (e.g., cellular telephones), portable digital assistants (PDAs), laptop computers, or any suitable device that is capable of communicating with a wireless network, is increasingly important to mobile terminal users. Security algorithms are often employed to achieve security between a mobile terminal and another network entity. These security algorithms often rely upon a secret that is shared between the mobile terminal and the other network entity that permits the mobile terminal to be authenticated. Typically, this shared secret is embodied in the form of a key. In order to further enhance the security, many security algorithms require re-keying at various intervals. Re-keying is a process in which new keys are established such that future communications may be protected with the new keys. If a third party obtained one set of keys and therefore compromised the security between the mobile terminal and the other network entity, re-keying would prevent the third party from continuing to be able to access the communication with the mobile terminal once a new set of keys has been established, thereby limiting temporally the security breach.

An example of client authentication for which secure communication is highly desirable is HTTP digest access authentication. HTTP digest access authentication verifies that both a client and a server know a shared secret (HTTP password). In HTTP digest access authentication, it is desirable that the verification be performed without sending the password in the clear, i.e., in an unprotected manner. Following performance of the verification, secure communications are commenced between the client and the server.

The HTTP digest access authentication scheme is based on a simple challenge-response paradigm. The scheme involves a challenge being issued to the client using a nonce value. A valid HTTP response to the challenge verifies knowledge of the shared secret. An HTTP response is generated as an output from a security algorithm or security function. The output contains a checksum of the username, the HTTP password, the nonce value, the HTTP method, the requested universal resource indicator (URI), and possibly other information (such as the payload). Accordingly, if the HTTP password can be obtained by another entity, security is lost with respect to subsequent communications.

A mobile terminal typically includes at least a user identity module (UIM) and mobile equipment (ME). The UIM is a low power processor that contains secure memory and provides secure processing. The UIM may be, for example, a universal integrated circuit card (UICC), a subscriber identity module (SIM), a removable user identity module (R-UIM), etc. Thus, the UIM may be a removable device or embedded in the mobile terminal. The ME contains a high power processor and is not assumed to contain secure memory or provide secure processing.

For mobile applications, an HTTP client either runs inside the UIM or at the ME. It is more desirable to run an HTTP client in the ME due to the high processing power of the ME. In this case, the HTTP response is either generated in the ME or delivered from the UIM to the ME. Then the HTTP response is sent from the ME to a network entity in order to perform verification of knowledge of the shared secret. The current means for accomplishing the delivery of the HTTP response to the ME requires that the HTTP password either be sent to or stored at the ME. The HTTP password may then be used to generate the HTTP response. However, since the ME may not contain secure storage and/or provide secure processing capability, the HTTP password is at risk of being compromised, thereby preventing secure communication between the HTTP client and the server.

In order to prevent the above described security risk, the HTTP response may be generated in the secure UIM. However, a digest response requires the HTTP client to use the password and optionally the entity body (HTTP payload), if integrity protection of the payload is selected (by setting qop="auth-int" in the appropriate headers). In such cases, how the UIM obtains the payload for the computation of the digest response is lacking. In particular, the payload may be large in size, and therefore sending the payload from the ME to the UIM is not desirable.

Additionally, in order to support server authentication, the digest response from the server must be verified by the HTTP client. Such verification currently also requires sending the password to the HTTP client for authentication, thereby decreasing security.

BRIEF SUMMARY

A method, computer program product and apparatus are therefore provided for verification of server digest response and provide integrity protection. Thus, the HTTP password is never exposed to an unsecured environment.

In one exemplary embodiment, an apparatus for securely communicating with a network is provided. The apparatus includes a password provisioning module (PPM), a password generating module a response verification module (RVM) and a response generation module (RGM). The PPM is configured to store a password. The password generating module is in operable communication with the PPM and configured to generate the password. The RGM and RVM are in operable communication with both the client application and the PPM. The RGM is configured to generate an authentication response from the password in response to a request from the client application. The RVM is configured to verify a request for a server digest response and generate a verification result in response to a request from the client application.

In another exemplary embodiment, a method for establishing secure receipt of a response such as a hyper text transfer protocol (HTTP) response in a mobile terminal is provided. The method includes receiving a request for an authentication response from a response generation module (RGM) in communication with a password provisioning module (PPM) and a client application sending the request. The PPM and RGM may be disposed at a user identity module (UIM). The method may also include sending a password from the PPM to the RGM in response to the request and generating the authentication response at the RGM from the password in response to the request and the password. The method may also include receiving a server digest response and verifying the server digest response.

In another exemplary embodiment, a computer program product for establishing secure receipt of a response in a mobile terminal is provided. The computer program product includes at least one computer-readable storage medium having computer-readable program code portions stored therein. The computer-readable program code portions include first, second, third, fourth and fifth executable portions. The first executable portion is for receiving a request for an authentication response from a response generation module (RGM) in communication with a password provisioning module (PPM) and a client application sending the request. The PPM and the RGM may be disposed at a user identity module (UIM). The second executable portion is for sending a password from the PPM to the RGM in response to the request. The third executable portion is for generating the authentication response at the RGM from the password in response to the request and the password. The fourth executable portion is for receiving a server digest response. The fifth executable portion is for verifying the server digest response.

In another exemplary embodiment, an apparatus for securely communicating with a network is provided. The apparatus includes means for receiving a request for an authentication response from a response generation module (RGM) in communication with a password provisioning module (PPM) and a client application sending the request. The PPM and the RGM may be disposed at a user identity module (UIM). The apparatus may also include means for sending a password from the PPM to the RGM in response to the request and means for generating the authentication response at the RGM from the password in response to the request and the password. The apparatus may also include means for receiving a server digest response and means for verifying the server digest response.

Embodiments of the invention provide a method and apparatus for generating an HTTP response in the secured UIM of a mobile terminal. As a result, security of communications between client applications on the mobile terminal and a network server may be improved.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Embodiments of the present inventions now will be described more fully hereinafter with reference to the accompanying drawings, in which some, but not all embodiments of the inventions are shown. Indeed, embodiments of these inventions may be embodied in many different forms and should not be construed as limited to the embodiments set forth herein; rather, these embodiments are provided so that this disclosure will satisfy applicable legal requirements. Like reference numerals refer to like elements throughout.

Figure 1:
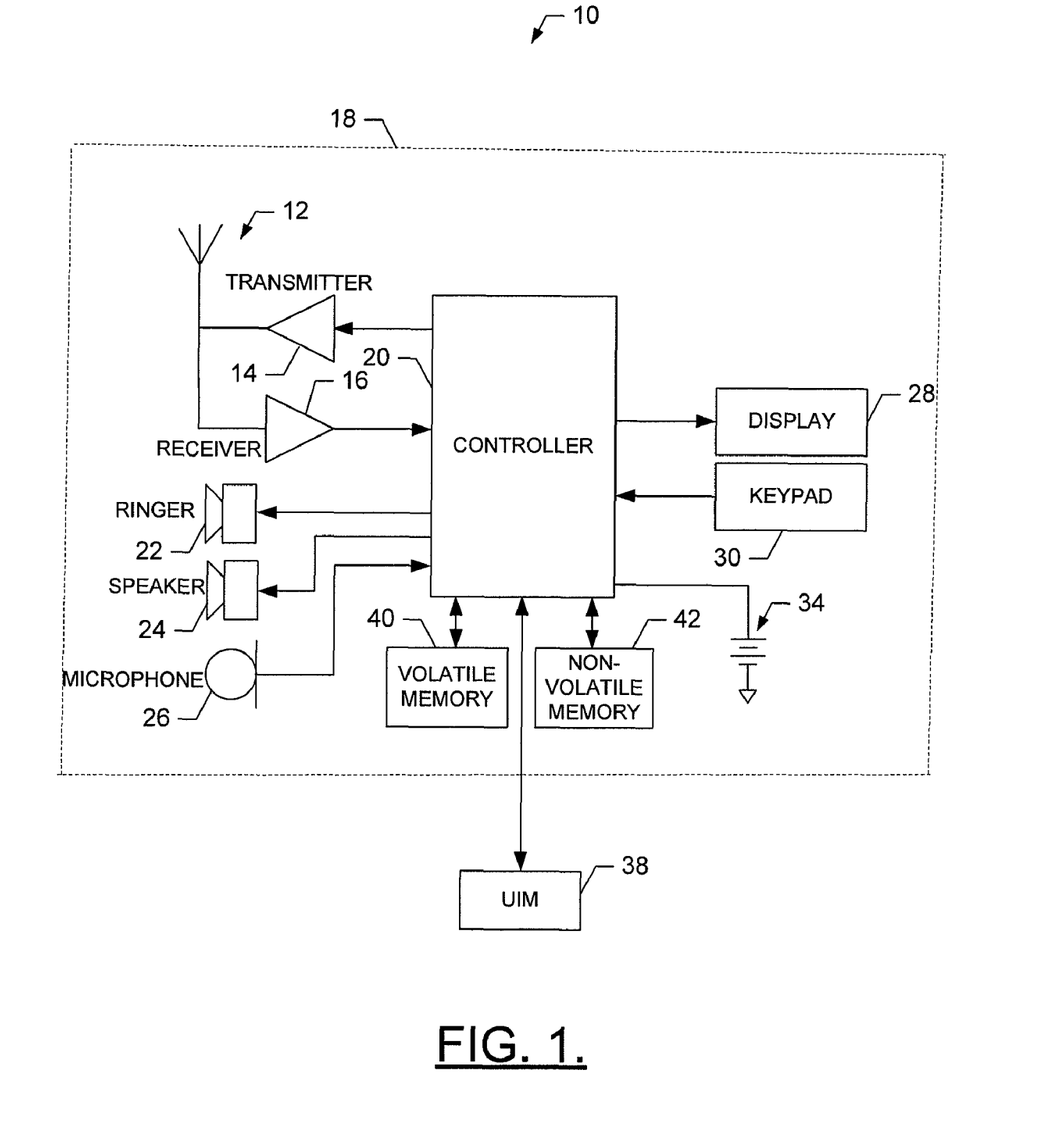
FIG. 1 is a schematic block diagram of a mobile terminal according to an exemplary embodiment of the present invention.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While several embodiments of the mobile terminal 10 are illustrated and will be hereinafter described for purposes of example, other types of mobile terminals, such as portable digital assistants (PDAs), pagers, laptop computers and other types of voice and text communications systems, can readily employ embodiments of the present invention. Moreover, the method of embodiments of the present invention will be primarily described in conjunction with mobile communications applications. But the method of embodiments of the present invention can be utilized in conjunction with a variety of other applications, both in the mobile communications industries and outside of the mobile communications industries. In addition, while several embodiments of the method of the present invention are performed or used by a mobile terminal 10, the method may be employed by other than a mobile terminal.

The mobile terminal 10 includes an antenna 12 in operable communication with a transmitter 14 and a receiver 16. The mobile terminal 10 further includes a controller 20 that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA).

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example. Also, for example, the controller 20 may be capable of operating a software application capable of creating an authorization for delivery of location information regarding the mobile terminal, in accordance with embodiments of the present invention (described below).

The mobile terminal 10 also comprises a user interface including a conventional earphone or speaker 22, a ringer 24, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 includes the conventional numeric (0-9) and related keys (#, *), and other keys used for operating the mobile terminal 10. The mobile terminal 10 further includes a battery 34, such as a vibrating battery pack, for powering various circuits that are required to operate the mobile terminal 10, as well as optionally providing mechanical vibration as a detectable output.

All of the above described elements of the mobile terminal 10 collectively comprise mobile equipment (ME) 18, e.g., a user equipment module. In addition to the ME 18, the mobile terminal 10 may include a universal identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal to implement the functions of the mobile terminal. For example, the memories can include an identifier, such as an international mobile equipment identification (IMEI) code, capable of uniquely identifying the mobile terminal 10.

Figure 2:
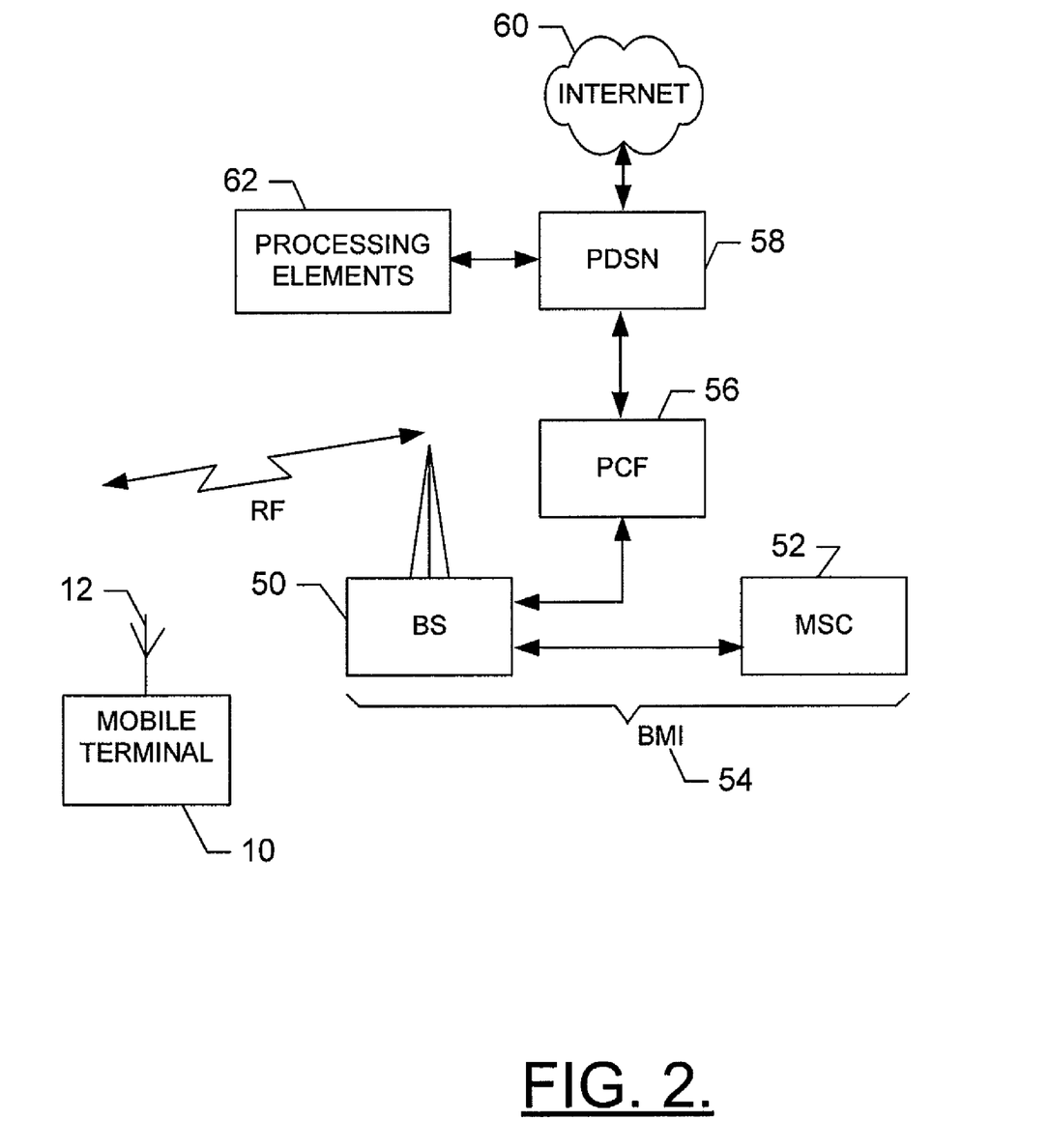
FIG. 2 is a schematic block diagram of a wireless communications system according to an exemplary embodiment of the present invention.

Referring now to FIG. 2, an illustration of one type of wireless communications network including a terminal, such as the mobile terminal 10, which would benefit from embodiments of the present invention is provided. As shown, the mobile terminal 10 includes the antenna 12 for transmitting signals to and for receiving signals from a base site or base station (BS) 50. The BS 50 is a part of a cellular network that includes a mobile switching center (MSC) 52, voice coder/decoders (vocoders), data modems, and other units required to operate the cellular network. The MSC 52 is capable of routing calls and messages to and from the mobile terminal 10 when the mobile terminal 10 is making and receiving calls. The cellular network may also be referred to as a Base Station/MSC/Interworking function (BMI) 54. The MSC 52 controls the forwarding of messages to and from the mobile terminal 10 when the mobile terminal 10 is registered with the cellular network, and also controls the forwarding of messages for the mobile terminal 10 to and from a message center (not shown). Such messages may include, for example, voice messages received by the MSC 52 from users of Public Switched Telephone Network (PSTN) telephones, and may also include Short Message Service (SMS) messages and voice messages received by the MSC 52 from the mobile terminal 10 or other mobile terminals serviced by the cellular network.

The mobile terminal 10 can also be coupled to a data network. For example, the BS 50 can be connected to a packet control function (PCF) 56, which is in connection with a Packet Data Serving Node (PDSN) 58. The PDSN 58 may be connected to a wide area network, such as the Internet 60. In turn, devices such as processing elements 62 (e.g., personal computers, server computers or the like) can be coupled to the mobile terminal 10 via the PDSN 58. By directly or indirectly connecting both the mobile terminal 10 and the other devices to the PDSN 58 and the Internet 60, the mobile terminal 10 can communicate with the other devices, such as according to the Internet Protocol (IP) specification, to thereby carry out various functions of the mobile terminal 10.

Although not every element of every possible network is shown and described herein, it should be appreciated that the mobile terminal 10 may be coupled to one or more of any of a number of different networks using one or more of any of a number of different modes (also referred to herein as protocols). In this regard, the network can be capable of supporting communication in accordance with any one or more of a number of first-generation (1G), second-generation (2G), 2.5G and/or third-generation (3G) mobile communication protocols or the like. More particularly, the mobile terminal may be coupled to a network capable of supporting communication in accordance with 2G wireless communication protocols IS-136 (TDMA), GSM, and IS-95 (CDMA). Also, for example, the network can be capable of supporting communication in accordance with 2.5G wireless communication protocols GPRS, Enhanced Data GSM Environment (EDGE), or the like. In addition, for example, one or more of the network(s) can be capable of supporting communication in accordance with 3G wireless communication protocols such as CDMA2000 and Universal Mobile Telephone System (UMTS) network employing Wideband Code Division Multiple Access (WCDMA) radio access technology. Additionally, the network may be capable of supporting wide area network (WAN) communications, such as WLAN (IEEE 802.11) or WiMAX (802.16). Some narrow-band AMPS (NAMPS), as well as TACS, network(s) may also benefit from embodiments of the invention, as should dual or higher mode mobile stations (e.g., digital/analog or TDMA/CDMA/analog phones).

Figure 3:
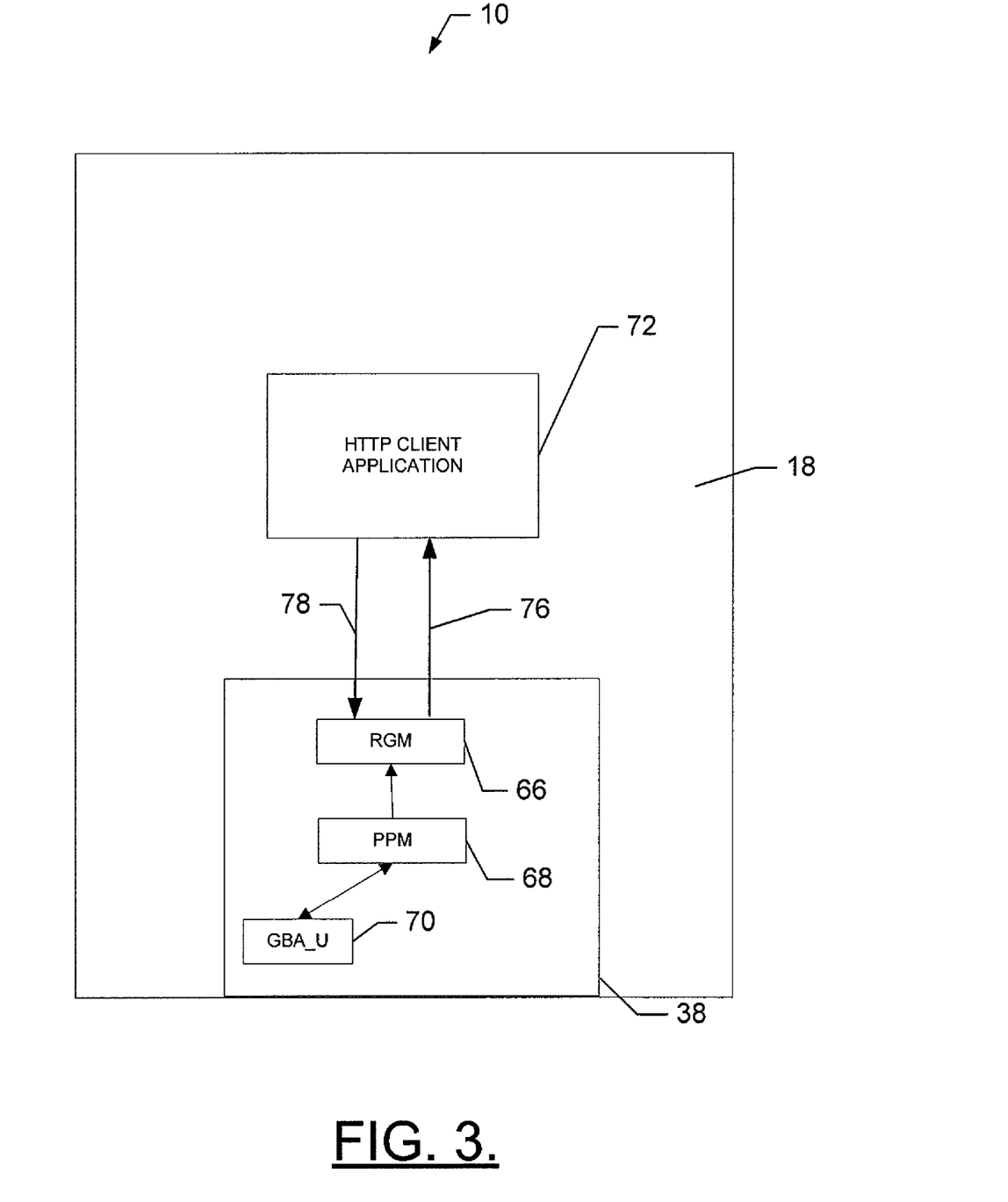
FIG. 3 illustrates a schematic block diagram of a mobile equipment (ME) and a user identity module (UIM) of the mobile terminal according to an exemplary embodiment of the present invention.

Reference is now made to FIG. 3, which illustrates a schematic block diagram of the ME 18 and UIM 38 of the mobile terminal 10 according to an exemplary embodiment of the present invention. It should be understood, however, that the mobile terminal 10 illustrated and hereinafter described is merely illustrative of one type of mobile terminal that would benefit from embodiments of the invention and, therefore, should not be taken to limit the scope of embodiments of the invention. FIG. 3 shows operation of the mobile terminal 10 for integrity protection of the HTTP payload.

As shown in FIG. 3, the UIM 38 includes a response generation module (RGM) 66, a password provisioning module (PPM) 68, and an HTTP password generating module which may employ, for example, a Generic Bootstrap Architecture (GBA). GBA is a framework architecture that allows bootstrapping (or changing) of a security key between the mobile terminal 10 and a home network, which can then be used to further derive security keys for use between the mobile terminal 10 and a network application server. GBA may be used as a mechanism to provide keys for securing internet protocol (IP) level handovers. For example, Third Generation Partnership Project 2 Wireless Local Area Networks (3GPP2-WLAN) and Third Generation Partnership Project Wireless Local Area Networks (3GPP-WLAN) working groups are developing mechanisms for mobile terminals to be authenticated securely when handing over from one network to another. Thus, for example, the HTTP password generating module may be a GBA unit (GBA_U) 70. The GBA_U 70 generates the HTTP password and sends the HTTP password to the PPM 68. The PPM 68 stores the HTTP password for all HTTP applications.

It should be noted that although an exemplary embodiment is described herein in reference to a UIM that may be associated with a particular user, embodiments of the present invention may be employed in many ways. For example, a UIM could be any secure element embodied in the form of an application executable at a computing device, in a stand alone device, etc. Furthermore, an HTTP client could also be embodied in many ways such as, for example, as any one of numerous client devices or client applications executed at a computing device.

In operation, when an HTTP client application 72 requires an HTTP response to establish secure communications with the processing element 62, the HTTP client application 72 sends a request 78 to the RGM 66. The request 78 includes information including an application identity, a username, optionally a hash of an HTTP payload (i.e., H(entity-body)) if payload integrity protection is required, and a nonce, all of which are received from the processing element 62 which may include an HTTP server. Alternatively, instead of sending H(entity-body), the ME may send the UIM the required information in other forms, e.g. as A2=Method ":" digest-uri-value ":" H(entity-body) (as defined in RFC 2617). It should be noted that the hash of the HTTP payload (instead of the payload itself) is included in the request 78 since the HTTP payload could be too large in size to be suitable for inclusion. Thus, the hash of the HTTP payload is used as a reduced size conversion of the HTTP payload. When the hash of the HTTP payload is included in the digest response computation, an HTTP server 84 (see FIG. 5) may verify whether payload content has been changed. Following receipt of the request 78, the RGM 66 requests the HTTP password from means, such as the PPM 68, for receiving the request for an authentication response from the RGM 66. Means, such as the PPM 68, sends the HTTP password to the RGM 66, which includes means for generating the HTTP response 76 from the username, the nonce, optionally the H(entity-body) if payload integrity protection is required, the HTTP password, etc. according to a security algorithm or security function. In an exemplary embodiment, the security algorithm may be that specified in IETF RFC 2617. The RGM 66 then sends the HTTP response 76 to the HTTP client application 72 to permit establishment of secure communications with the processing element 62. An interface between the HTTP client application 72 and the RGM 66 may be, for example, via a 3GPP2 or a 3GPP protocol.

In an exemplary embodiment, the UIM 38 may calculate a valid HTTP response, a portion of which may include an authorization header. The valid HTTP response contains a checksum of the username, the HTTP password, the nonce value, and optionally the H(entity-body) if payload integrity protection is required, the HTTP method and the requested URI. The username is set to a bootstrapping transaction ID (B-TID) which is passed by the ME 18 to the UIM 38. The HTTP password is set to be a Ks_int_NAF (base64 encoded). The Ks_int_NAF is generated using the GBA_U 70 inside the UIM 38. The nonce value, the HTTP method and the requested URI are passed to the UIM 38 by the ME 18. Upon receipt of the username, the HTTP password, the nonce value, optionally the H(entity-body), the HTTP method and the requested URI, the UIM 38 (specifically the RGM 66 of the UIM 38) generates the valid HTTP response and sends the valid HTTP response to the ME 18.

Figure 4:
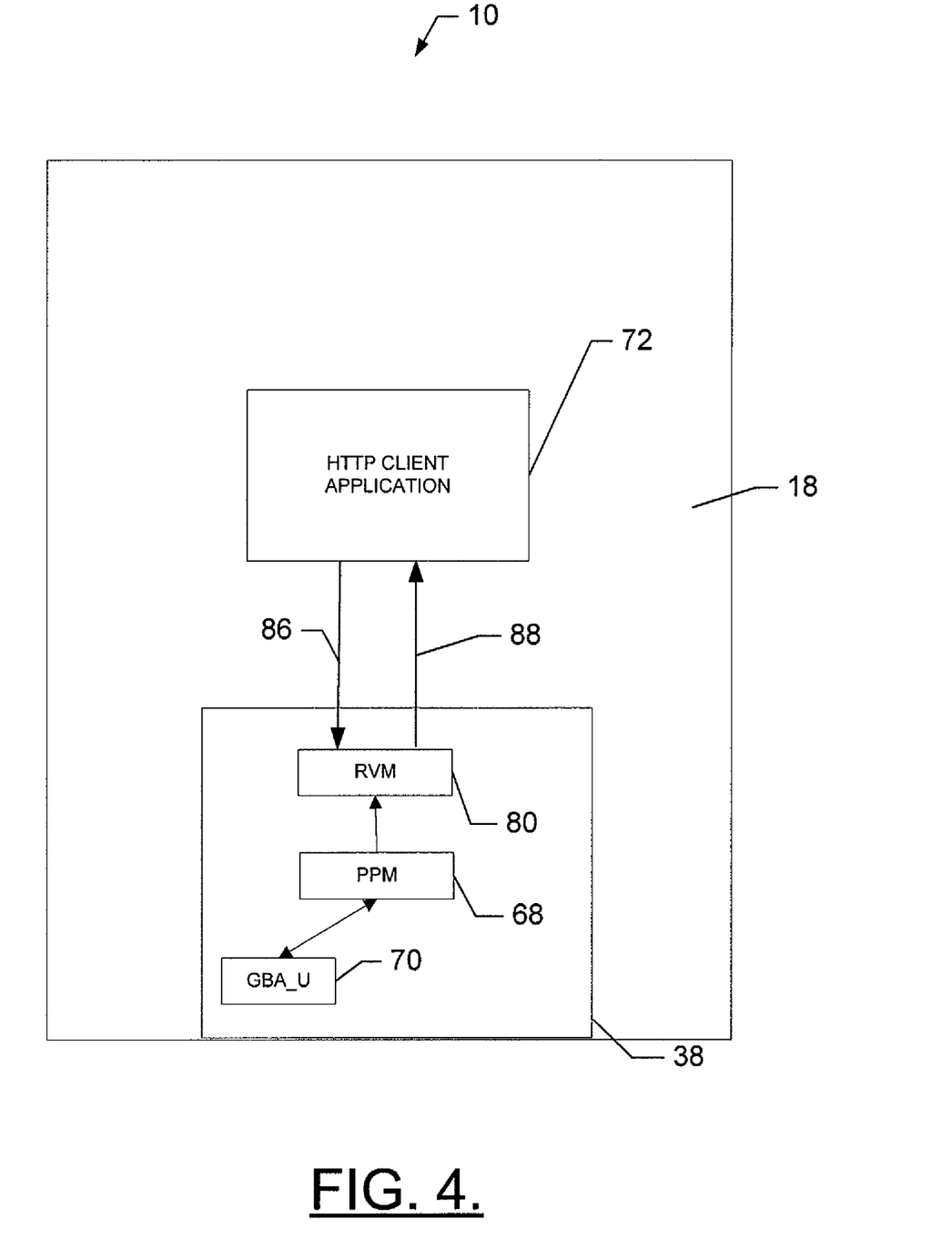
FIG. 4 illustrates a schematic block diagram of a mobile equipment (ME) and a user identity module (UIM) of the mobile terminal according to another exemplary embodiment of the present invention.

Referring now to FIG. 4, operation of the mobile terminal 10 for verification of a server digest response is described. As shown in FIG. 4, the UIM 38 includes a response verification module (RVM) 80, the password provisioning module (PPM) 68, and the GBA_U 70. The RVM 80 may be an application stored in the UIM 38. The GBA_U 70 generates the HTTP password and sends the HTTP password to the PPM 68. The PPM 68 stores the HTTP password for all HTTP applications. It is assumed that the RGM 66 has sent the HTTP response to the HTTP client application 72 as described above. Accordingly, in response to receipt by means, such as the HTTP client application 72, of a server digest response from the HTTP server 84, means, such as the HTTP client, may require verification of the server digest response if such verification is desired.

In operation, an HTTP client application 72 receives the server digest response and sends a verification request 86 to the RVM 80. The verification request 86 includes information including the server digest response, optionally the H(entity-body) and a cnonce (client nonce), etc. The RVM 80 then requests the HTTP password from the PPM 68. The PPM 68 sends the HTTP password to the RVM 80. The RVM 80 then generates a calculated server digest response using the cnonce, optionally the H(entity-body), the HTTP password, etc. according to a security algorithm or security function. In an exemplary embodiment, the security algorithm may be that specified in IETF RFC 2617. The RVM 80 then checks validity of the server digest response compared to the calculated server digest response and sends verification results 88 to the HTTP client application 72 to verify the server digest response.

It should be noted that the methods for integrity protection of the HTTP response and verification of the server digest response described above with reference to FIGS. 3 and 4, respectively, are optional and may be implemented responsive to particular signals received. For example, if integrity protection is desired, the H(entity-body) may be included in the request 78.

Figure 5:
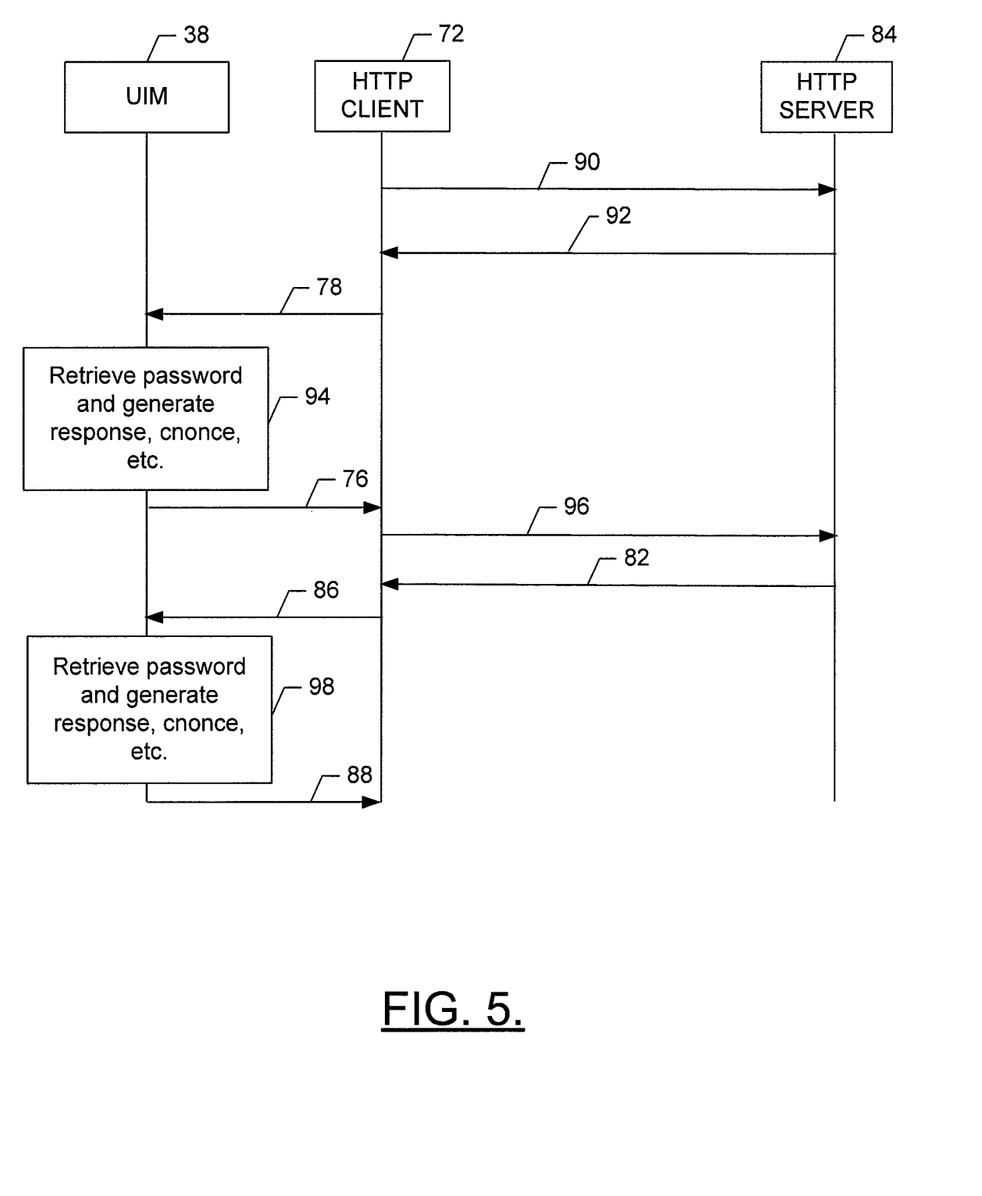
FIG. 5 is a control flow diagram illustrating a method for verification of server digest response and response integrity protection according to an exemplary embodiment of the present invention.

FIG. 5 is a control flow diagram of a method for providing verification of server digest response and response integrity protection according to an exemplary embodiment. As shown in FIG. 5, the HTTP client application 72 sends an HTTP request 90 to the HTTP server 84. In response to the HTTP request 90, the HTTP server 84 sends a request for authentication 92 to the HTTP client application 72. The HTTP client application then sends the request 78 including the application identity, the username, optionally the H(entity-body) and the nonce to the UIM 38. At operation 94, the UIM 38 retrieves the HTTP password and generates an HTTP response and cnonce (a random number as a challenge to the server) as described above with reference to FIG. 3. The UIM 38 then sends the HTTP response 76 to the HTTP client application 72. The HTTP client application 72 then sends a message 96 including the HTTP response in a request to the HTTP server 84. In response to receipt of the message 96, the HTTP server 84 sends a message 82 that includes the server digest response to the HTTP client applications 72. In response to receipt of the message 82 including the server digest response, the HTTP client application 72 sends the verification request 86 to the UIM 38. The verification request 86 includes the server digest response, the cnonce, optionally the H(entity-body), etc. At operation 98, the UIM 38 retrieves the HTTP password and verifies the server digest response. The UIM 38 then sends the verification result 88 to the HTTP client application 72.

Figure 6:
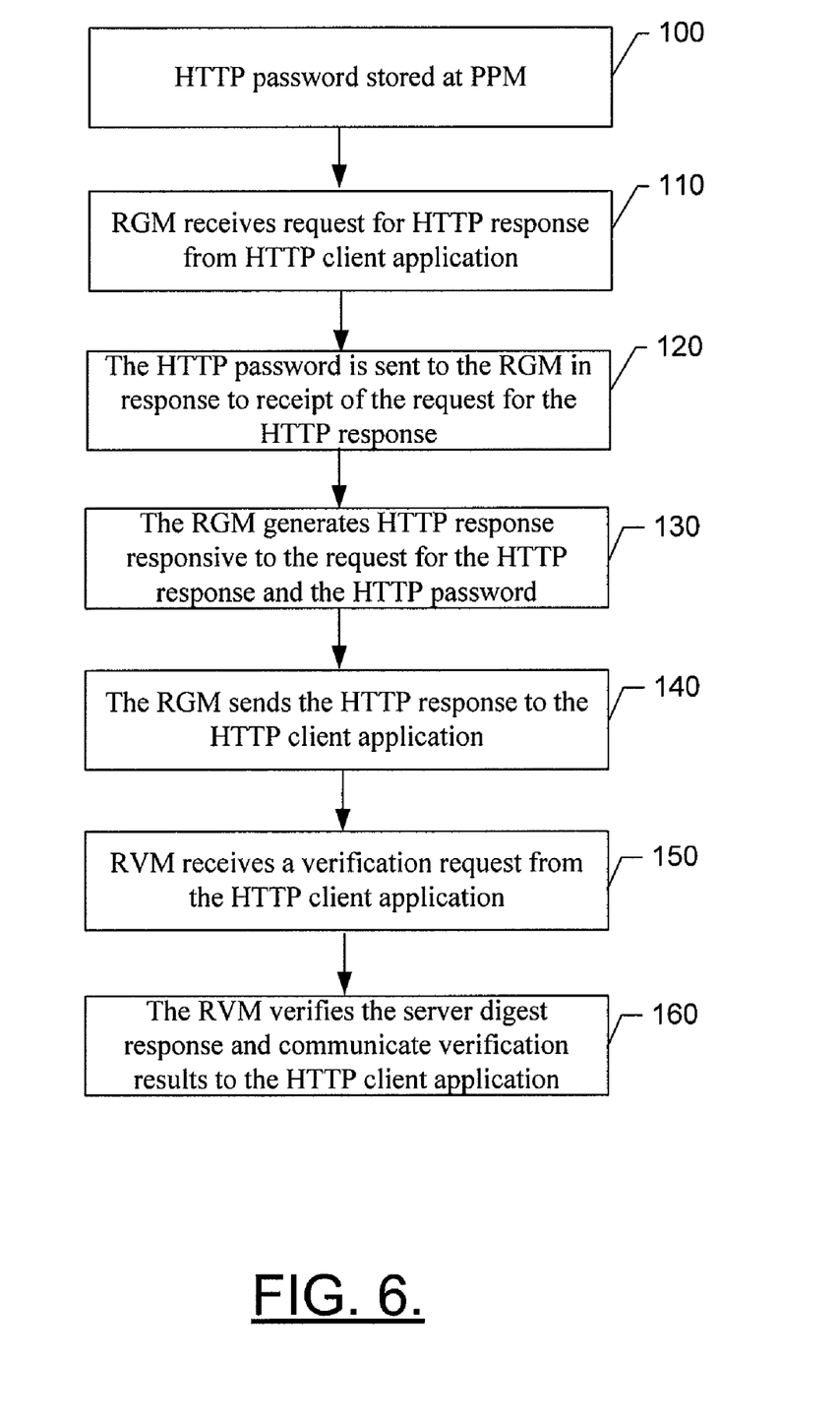
FIG. 6 illustrates a flowchart according to an exemplary method for verification of server digest response and response integrity protection in a mobile terminal according to an exemplary embodiment of the present invention.

FIG. 6 is a flowchart of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the GBA_U 70, the PPM 68, the RGM 66, the RVM 80 and the HTTP client application 72 may be embodied by computer program instructions. In this regard, the computer program instructions which embody the GBA_U 70, the PPM 68, the RVM 80 and the RGM 66 may be stored by the memory device of the UIM 38 and executed by the built-in processor. The HTTP client application 72 is typically stored in memory of the ME 18 and executed by the controller 20. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for secure HTTP digest response in a mobile terminal includes storing an HTTP password at a UIM at operation 100. An RGM of a UIM receives a request for an HTTP response from an HTTP client application at operation 110. The request includes at least a hash of a payload message. This request by the HTTP client application may be in response to an inquiry by a server or other network entity to verify that the client, i.e., the mobile terminal 10, knows the shared secret such that secure communication can be conducted. At operation 120, the HTTP password is sent to the RGM in response to receipt of the request for the HTTP response. At operation 130, the RGM generates an HTTP response responsive to the request for the HTTP response and the HTTP password. At operation 140, the RGM sends the HTTP response to the HTTP client application. At operation 150, an RVM receives a verification request of a server digest response from the HTTP client application. The RVM verifies the server digest response and communicates the verification results to the HTTP client application at operation 160. Thus, the HTTP password never leaves the secured UIM, but the HTTP client application still obtains the HTTP response that is needed to verify to the server or other network entity that the mobile terminal 10 knows the shared secret. Therefore, security of communications between the HTTP client application and a server at a network is less likely to be compromised.

It should be noted that the method and system described above are also applicable to establishing secure authentication of devices other than via HTTP digest access authentication. However, HTTP digest access authentication is described above, in detail, to provide a complete description of one exemplary embodiment of such a method and system.

Many modifications and other embodiments of the inventions set forth herein will come to mind to one skilled in the art to which these inventions pertain having the benefit of the teachings presented in the foregoing descriptions and the associated drawings. Therefore, it is to be understood that embodiments of the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising a processor and memory including computer program code, the memory and computer program code configured to, with the processor, cause the apparatus to:

direct storage of a password at a password provisioning module (PPM);

direct generation of the password at a password generating module in operable communication with the PPM;

direct generation of an authentication response from the password in response to a request from a client application, the authentication response being generated by a response generation module (RGM) in operable communication with both the client application of a mobile terminal and the PPM, the mobile terminal having processing and memory resources separate from the processor and the memory, the RGM being disposed at a user identity module (UIM) of the mobile terminal to enable generation of the authentication response at the UIM for provision of the authentication response to the client application; and direct verification of a request for a server digest response and generation of a verification result in response to a request from the client application via a response verification module (RVM) in operable communication with both the client application and the PPM, wherein the apparatus further comprises the UIM and the UIM is configured to enable sending the password from the PPM to the RGM such that the password never leaves the UIM.

2. The apparatus of claim 1, wherein the RGM is configured to generate the authentication response from the password and a hash of a payload message.

3. The apparatus of claim 1, wherein the RGM is configured to send the authentication response to the client application.

4. The apparatus of claim 1, wherein the password comprises a hyper text transfer protocol (HTTP) password.

5. The apparatus of claim 4, wherein the authentication response comprises a HTTP response.

6. The apparatus of claim 1, wherein the authentication response comprises a hyper text transfer protocol (HTTP) response including a checksum of a username, the password, a nonce value, an HTTP method, a requested universal resource identifier (URI) and a hash of an HTTP payload.

7. The apparatus of claim 1, wherein the request includes an application identity, a username, a nonce and a hash of a hyper text transfer protocol (HTTP) payload.

8. The apparatus of claim 1, wherein the password generating module comprises a generic bootstrapping architecture unit.

9. A method comprising:
  receiving a request for an authentication response from a response generation module (RGM) in communication with a password provisioning module (PPM) and a client application sending the request, the PPM and the RGM being embodied by a user identity module (UIM) comprising a processor and memory separate from processing and memory resources of a mobile terminal with which the UIM is associated;
  causing sending a password from the PPM to the RGM in response to the request, the UIM being configured to enable sending the password from the PPM to the RGM such that the password never leaves the UIM;
  causing generating the authentication response at the RGM from the password in response to the request, and the password, to enable provision of the authentication response from the RGM of the UIM to the client application;
  receiving a server digest response; and
  causing verifying the server digest response.

10. The method of claim 9, wherein generating the response further comprises generating the authentication response from the password in response to the request, the password and a hash of a payload message.

11. The method of claim 9, further comprising sending the authentication response from the RGM to the client application.

12. The method of claim 9, wherein generating the authentication response comprises generating a hyper text transfer protocol (HTTP) response including a checksum of a username, the password, a nonce value, an HTTP method, a requested universal resource identifier (URI) and a hash of an HTTP payload.

13. The method of claim 9, wherein receiving the request includes receiving the request which includes an application identity, a username, a nonce and a hash of a hyper text transfer protocol (HTTP) payload.

14. The method of claim 9, further comprising generating the password in a generic bootstrapping architecture unit.

15. The method of claim 9 further comprising storing the password in the PPM.

16. The method of claim 15, wherein storing the password comprises storing a hyper text transfer protocol (HTTP) password.

17. The method of claim 16, wherein receiving the request for the authentication response comprises receiving a request for an HTTP response.

18. A computer program product comprising at least one non-transitory computer-readable storage medium having computer-readable program code portions stored therein, the computer-readable program code portions comprising:
  a first executable portion for receiving a request for an authentication response from a response generation module (RGM) in communication with a password provisioning module (PPM) and a client application sending the request, the PPM and the RGM being embodied by a user identity module (UIM) comprising a processor and memory separate from processing and memory resources of a mobile terminal with which the UIM is associated;
  a second executable portion for sending a password from the PPM to the RGM in response to the request, the second executable portion including instructions for sending the password from the PPM to the RGM such that the password never leaves the UIM;
  a third executable portion for generating the authentication response at the RGM from the password in response to the request, and the password, to enable provision of the authentication response from the RGM of the UIM to the client application;
  a fourth executable portion for receiving a server digest response; and
  a fifth executable portion for verifying the server digest response.

19. The computer program product of claim 18, wherein the third executable portion includes instructions for generating the authentication response from the password in response to the request, the password and a hash of a payload message.

20. The computer program product of claim 18, further comprising a sixth executable portion for sending the authentication response from the RGM to the client application.

21. The computer program product of claim 18, wherein the third executable portion includes instructions for generating a hyper text transfer protocol (HTTP) response including a checksum of a username, the password, a nonce value, an HTTP method, a requested universal resource identifier (URI) and a hash of an HTTP payload.

22. The computer program product of claim 18, wherein the first executable portion includes instructions for receiving the request which includes an application identity, a username, a nonce and a hash of a hyper text transfer protocol (HTTP) payload.

23. The computer program product of claim 18, further comprising a sixth executable portion for generating the password in a generic bootstrapping architecture unit.

24. The computer program product of claim 18 further comprising a sixth executable portion for storing the password in the PPM.

25. The computer program product of claim 24, wherein the sixth executable portion includes instructions for storing a hyper text transfer protocol (HTTP) password.

26. The computer program product of claim 25, wherein the first executable portion includes instructions for receiving a request for an HTTP response.

27. An apparatus comprising:
  means for receiving a request for an authentication response from a response generation module (RGM) in communication with a password provisioning module (PPM) and a client application sending the request, the PPM and the RGM being embodied by a user identity module (UIM) comprising a processor and memory separate from processing and memory resources of a mobile terminal with which the UIM is associated;

means for sending a password from the PPM to the RGM in response to the request such that the password never leaves the UIM;

means for generating the response at the RGM from the password in response to the request, and the password, to enable provision of the authentication response from the RGM of the UIM to the client application;

means for receiving a server digest response; and means for verifying the server digest response.

28. The apparatus of claim 27, wherein means for generating the authentication response further comprises means for generating the response from the password in response to the request, the password and a hash of a payload message.

* * * * *